R. M. CATLIN.
Water-Elevator.

No. 221,778. Patented Nov. 18, 1879.

WITNESSES:
C. Neveux
C. Sedgwick

INVENTOR:
R. M. Catlin
BY Munn & Co
ATTORNEYS.

UNITED STATES PATENT OFFICE.

ROBERT M. CATLIN, OF TUSCARORA, NEVADA.

IMPROVEMENT IN WATER-ELEVATORS.

Specification forming part of Letters Patent No. 221,778, dated November 18, 1879; application filed June 5, 1879.

*To all whom it may concern:*

Be it known that I, ROBERT MAYO CATLIN, of Tuscarora, in the county of Elko and State of Nevada, have invented a new and Improved Apparatus for Elevating Water, of which the following is a specification.

My improvement relates to apparatus for raising water by compressed air, and the apparatus is especially intended for use in mines as a substitute for pumps. The use of pumps for that purpose is open to many objections and disadvantages, such as loss of power from friction and by reason of the distance the plungers are placed from the motor, the disarrangement of valves and other mechanism, and the cutting out of the piston-heads and cylinders by the grit contained in the water.

The object of my invention is to raise the water by direct pressure of compressed air, so as to avoid complicated mechanism and valves.

The invention consists in the combination, with an inclosed cylinder having valved pipes and connected by a valved pipe with the rising main, of a movable central rod having collars, ports, and grooves, and a valved case having inlet and outlet grooved valve, and pipes with ports, all as hereinafter more fully described.

Figure 1:
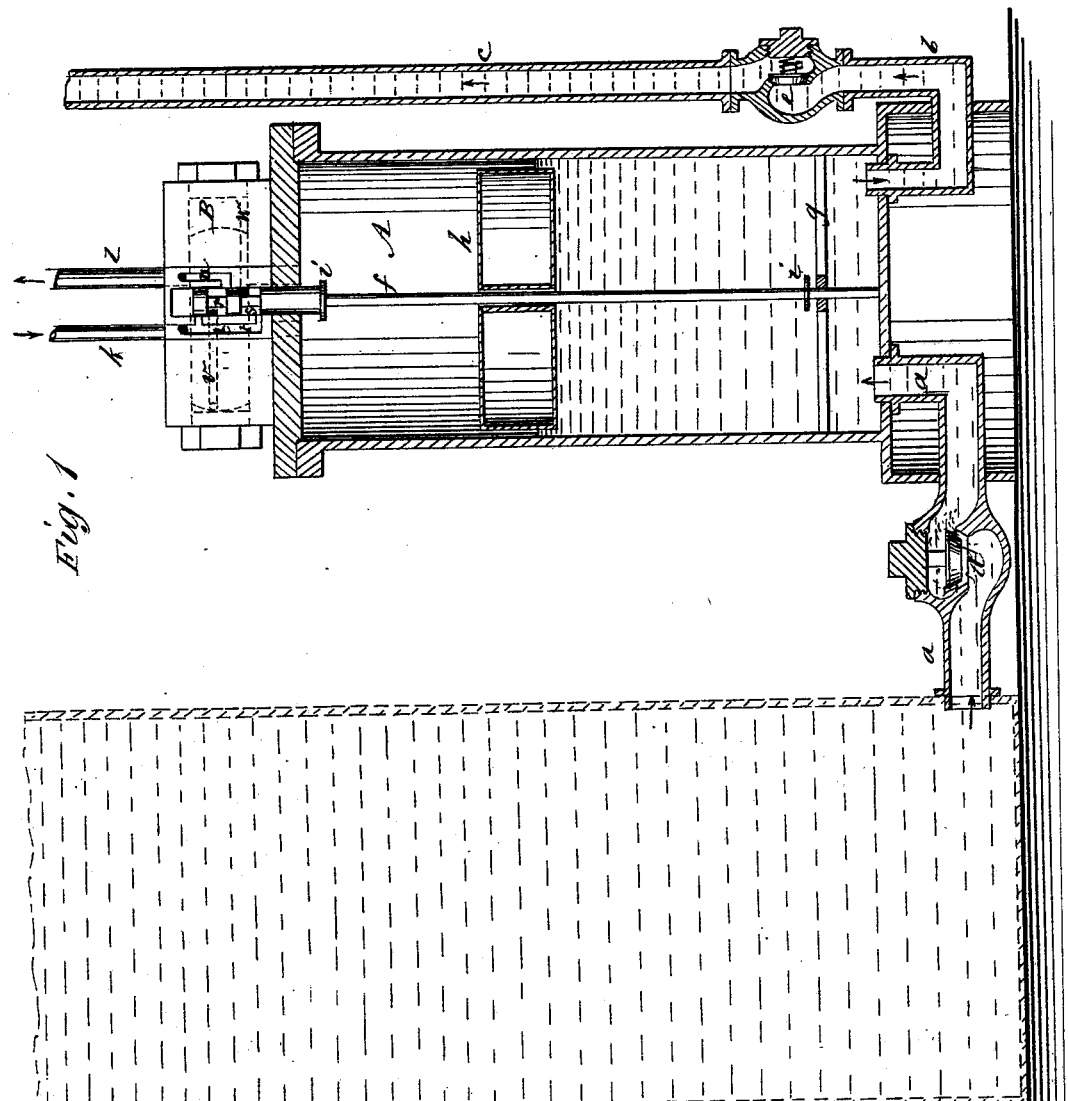
Figure 2:
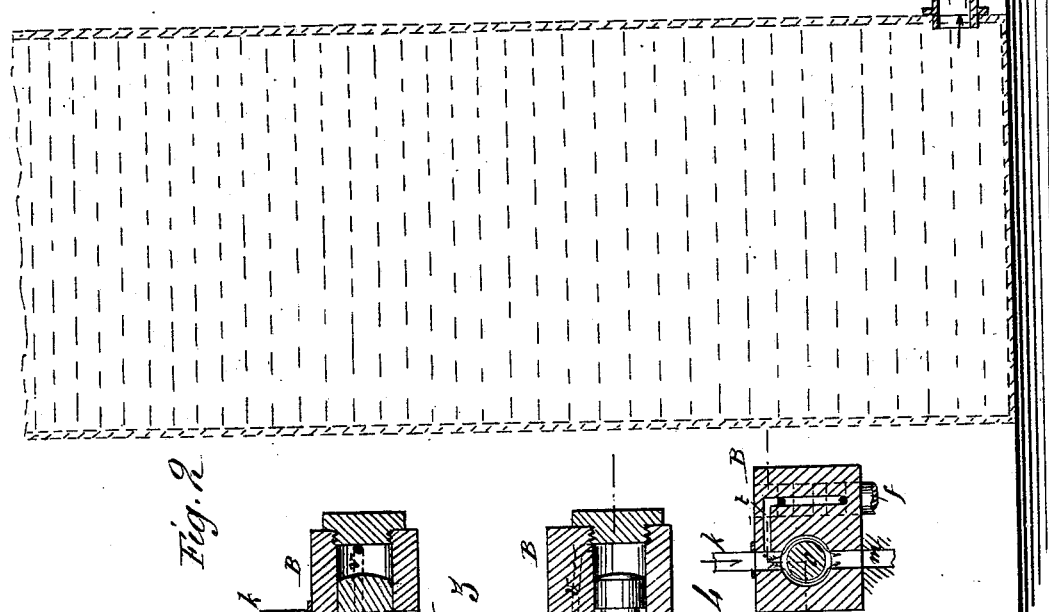
Figure 3:
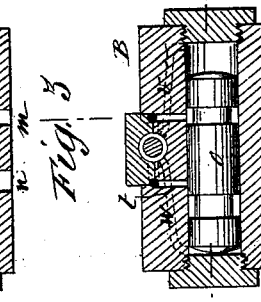
Figure 4:
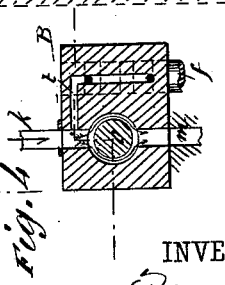

Figure 1 is a vertical section of the apparatus. Fig. 2 is a vertical longitudinal section of the valves for admission and exhaust of the air. Fig. 3 is a horizontal section, and Fig. 4 a cross-section, of the valves.

Similar letters of reference indicate corresponding parts.

A is a hollow cylinder, having its ends closed, and provided at its lower end with a pipe, $a$, for inlet of water, and connected by the outlet-pipe $b$ with the rising main $c$. The pipe $a$ is fitted with a check-valve, $d$, to prevent back flow, and pipe $b$ with a check-valve, $e$, to retain the water in the main when the air-pressure is removed.

Within the cylinder A is a valve-rod, $f$, that is sustained at its lower end by a cross-stay, $g$, and projects through the upper end of cylinder A into the valve-case B, and the rod $f$ is capable of lengthwise movement for the purpose of opening and closing the valves, as hereinafter described.

Within the cylinder A there is also a float, $h$, which moves up and down on rod $f$ as the water rises and falls, and upon the rod $f$ are lugs or collars $i\ i$, with which the float $h$ comes in contact at the extremes of its movement, and thereby moves the rod $f$ and shifts the valves.

The pipe $k$ from the upper side of valve-case B leads to a reservoir of compressed air, and the exhaust-pipe $l$ may discharge at any desired place.

$m$ is the inlet-port from case B to cylinder A, and $n$ the exhaust-port. Within case B is fitted a cylindrical valve, $o$, which is formed with annular grooves, and is capable of endwise movement for cutting off either port and opening the other.

The projecting end of stem $f$, which enters a recess in the side of case B, is formed with grooves $r\ s$, that communicate by ports $t\ u$ with the pipes $k\ l$, and by ports $v\ w$ with the interior of the case B at opposite ends of valve $o$.

In the position as shown in Fig. 1, the stem $f$ being down, compressed air from pipe $k$, through port $t$, groove $s$, and port $w$, has moved valve $o$, cut off the air from the cylinder, and opened the exhaust. As soon as the cylinder is filled with water the float $h$ raises rod $f$, and the compressed air, through port $t$, groove $r$, and port $v$, moves the valve $o$, closes exhaust-port $m$, and opens the inlet-port $n$. This permits the compressed air to enter the cylinder A, and the water will be forced out by pipe $b$ to the main $c$ until the valve is again shifted by the fall of the float acting on stem $f$.

The cylinder A is to be placed where it will fill with water by gravity, and I prefer to place one apparatus at the bottom of the mine to force the water to a tank at a higher level, which tank will supply a similar apparatus to force the water still higher, and so on until the surface is reached.

To obtain a more rapid discharge, each apparatus may consist of two cylinders with a single set of valves, operated by a lever connected to the valve-rods, so that as one cylinder is filling the other will be discharging.

The above apparatus is simple, contains no parts liable to get out of order, and is readily accessible in all its parts for repairs.

The operation will be more or less rapid according to the quantity of water, and will thus regulate itself to the work.

Having thus described my invention, I claim as new and desire to secure by Letters Patent—

The combination, with the end-closed cylinder A, having valved pipes $d\ a\ b\ e$, of the rod $f$, having collars $i\ i$, ports $v\ w$, and grooves $r\ s$, and the valve-case B, having pipes $k\ l$, provided with the ports $t\ u$, inlet and outlet $m\ n$, and grooved valve $o$, as and for the purpose specified.

ROBT. MAYO CATLIN.

Witnesses:
 E. R. BOYNTON,
 HENRY G. CATLIN.